United States Patent [19]

McCarthy, Jr.

[11] 3,903,163
[45] Sept. 2, 1975

[54] N,N-DISUBSTITUTED NAPHTHALENEACETAMIDINES

[75] Inventor: James R. McCarthy, Jr., Midland, Mich.

[73] Assignee: The Dow Chemical Company, Midland, Mich.

[22] Filed: Oct. 2, 1974

[21] Appl. No.: 510,956

[52] U.S. Cl......... 260/564 R; 260/501.14; 424/316; 424/326
[51] Int. Cl.......................................... C07c 129/08
[58] Field of Search.................... 260/564 R, 501.14

[56] References Cited
OTHER PUBLICATIONS
Chem. Abstr., Vol. 71, col. 111,086(t).

Chem. Abstr., Vol. 57, col. 4609(g).

Primary Examiner—Gerald A. Schwartz
Attorney, Agent, or Firm—Maynard R. Johnson

[57] ABSTRACT

N,N'-Disubstituted naphthaleneacetamidine compounds such as N,N'-dimethyl-2-naphthaleneacetamidine, and their pharmaceutically-acceptable salts are prepared by the reaction of a substituted 2-naphthylacetonitrile with an alkylamine and an alkylammonium salt, or alternatively, by reaction of a 2-naphthyl-N-alkylacetamide with a trialkyloxonium fluoroborate followed by reaction with a primary alkylamine. The compounds have pharmacological activity as antidepressants and antianxiety or calming agents.

4 Claims, No Drawings

N,N-DISUBSTITUTED NAPHTHALENEACETAMIDINES

BACKGROUND OF THE INVENTION

DESCRIPTION OF THE PRIOR ART

The substituted amidine compounds of the invention can be prepared by a modification of known methods. Typical methods which can be so modified include the reaction of a nitrile with a trialkyloxonium fluoroborate to prepare an N-alkyl nitrilium salt in a procedure similar to that of Meerwein et al., Ber. 89, 209 (1956), Borch, J. Org. Chem., 34, 627 (1969), and Weintraub et al. J. Org. Chem. 33, 1679 (1968). A number of N-monosubstituted and unsubstituted amidines are known. Craver et al. J. Pharm. Exptl. Therap. 99, 353 (1950); Netherlands Application No. 6,508,754, C.A. 65, 2181c (1966); U.S. Pat. Nos. 3,344,138, 3,417,122 and 3,334,137. β-Naphthamidine is also known. Markwardt et al., Pharmazie, 1969, 24(7), 400-2.

SUMMARY OF THE INVENTION

This invention is directed to N,N'-disubstituted 2-naphthaleneacetamidine compounds and is particularly directed to N,N'-disubstituted 2-naphthaleneacetamidine compounds and their pharmaceutically-acceptable salts corresponding to the formula

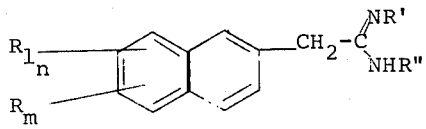

wherein R and $R_1$ represent halo, loweralkoxy or loweralkyl of one to two to three carbon atoms, $m$ and $n$ each independently represent one of the integers zero or one; and wherein R' and R'' each independently represent loweralkyl of one to two to three carbon atoms. The compounds of the invention are crystalline solids at ordinary temperatures, and are variously soluble in conventional solvents such as water, alcohols, ether, benzene, chlorinated hydrocarbons and the like. The free base compounds are generally less soluble in water than the salts, particularly under alkaline conditions, while the pharmaceutically-acceptable salts are generally of moderate to good solubility in water and alcohols.

In the present specification and claims, the term "halo" is employed to designate one of the halogen moieties chloro or bromo.

The compounds of the invention are named as 2-naphthaleneacetamidines. For convenience, the compounds can be referred to generically as "substituted amidines." When R' and R'' are different, the amidine moiety is subject to tautomerization, e.g.,

and the compound will generally be obtained as a mixture of the tautomers. Such mixtures of tautomers are useful as described herein, and for convenience will be named by naming only one tautomeric form. Compounds wherein R' and R'' are identical are generally preferred. The term "pharmaceutically acceptable salt" as herein employed refers to salts of a substituted amidine which are substantially non-toxic at dosages consistent with good pharmacological activity i.e., salts of pharamaceutically acceptable acids. Such pharmaceutically acceptable salts include nontoxic acid addition salts with inorganic acids such as hydrochloric, hydrobromic, sulfuric or phosphoric acid, or with organic acids such as acetic, succinic, malic, maleic, tartaric or citric acid, or with organic sulfonic acids such as methanesulfonic or p-toluenesulfonic acid.

The substituted amidines of the invention have been found to be useful for administration to laboratory animals in the study of drug effects on the central nervous system, and have been found to be particularly useful as antidepressants and antianxiety or calmative agents. The compounds wherein R is hydrogen have excellent antidepressant activity as well as calmative activity, and are preferred compounds.

The substituted amidines of the invention can be prepared by the reaction of the corresponding substituted naphthylacetamide with a trialkyloxonium fluoroborate to prepare the corresponding N-alkyl substituted arylnitrilium fluoroborate salt; followed by the reaction of N-alkyl substituted arylnitrilium fluoroborate with a primary alkylamine.

This reaction is preferably carried out in the presence of an inert organic liquid such as methylene chloride or nitromethane.

In the preparation of the fluoroborate salt intermediates, the reaction proceeds when the acetamide starting material and the trialkyloxonium fluoroborate are contacted and mixed in the presence of an anhydrous organic liquid reaction medium. The mixing is carried out in dry reaction vessels under an inert gas blanket. The reaction proceeds at temperatures from about 0°C. to about boiling under reflux, and is conveniently carried out at temperatures from about 25°C. to about 50°C. The exact proportions of the reactants to be employed can be varied. However, it is convenient to employ from about 1 to about 3 molar proportions of the trialkyloxonium fluoroborate reactant for each molar proportion of nitrile or acetamide starting material. The reaction is generally complete within about 12 to about 72 hours depending on temperature employed. The intermediate salt can be separated by evaporation of the reaction medium. if desired, or it can be reacted with the primary alkylamine without separation. Preferably, the fluoroborate salt intermediate is not separated from the reaction mixture but is reacted directly with a primary alkylamine to prepare a substituted amidine product.

The reaction of the fluoroborate salt intermediate with the primary alkylamine proceeds when the reactants are contacted and mixed in the presence of an inert organic liquid reaction medium, such as nitromethane or methylene chloride. The reaction proceeds at temperatures of from about −70°C to about 30°C. The exact proportions of the reactants to be employed can be varied, however, the reaction consumes the reactants in equimolar proportions, and use of the reactants in such proportions or with an excess of the primary alkylamine reaction is preferred. The reaction is generally complete in about 1 to about 18 hours. The product can be separated by evaporation under reduced pressure followed by the addition of aqueous alkali to neutralize any remaining fluoroborate, followed by extraction with an organic solvent such as ethyl acetate. Alternatively, the product can be isolated directly as the fluoroborate salt by evaporation of the reaction medium and washing with water. The product can be purified by conventional procedures such as washing, recrystallization, extraction, or treatment on ion exchange resins. The free base product can also be purified by conversion to a pharmaceutically-acceptable salt and purification in the salt form. When the product is obtained as the fluoroborate salt, it can be conveniently neutralized to obtain the free base which can be purified or converted to a pharmaceutically-acceptable salt.

It will be immediately apparent that the foregoing procedure includes a number of disadvantages. It requires a two-step process; it requires an expensive and somewhat esoteric starting material, the trialkyloxonium fluoroborate salt; and the reaction requires anhydrous conditions and an inert gas blanket.

In addition, the yields of ultimate product have been found to be undesirably low — on the order of 30 to 40 percent. Accordingly, the invention also provides a novel method for preparing the amidines by a one-step procedure using relatively inexpensive reactants, which can produce the product in a desirable form in good yields and without requiring an inert gas to protect the reactants.

In the new procedure, the N,N'-disubstituted 2-naphthaleneacetamidines are produced by reacting the corresponding 2-naphthylacetonitrile directly with the corresponding primary amine and the corresponding primary ammonium ion, In general, good results can be obtained by using, for each molar proportion of the nitrile, from about one to two to about ten molar proportions of alkylamine salt; and from about 20 to about 40 molar proportions of alkylamine (free base). Lower alkanol and excess alkylamine can also serve as a reaction medium, and the maximum proportions to be employed are limited by factors such as convenience of separating the product from the medium and increased reaction time and energy requirements as the excess of reaction medium is increased.

In a convenient procedure, about 20 to 40 molar proportions of alkylamine, one to ten molar proportions of alkylamine salt, and about 20 to 100 molar proportions of a lower alkanol of 1 to 3 carbon atoms are employed per molar proportion of the nitrile. The materials are mixed together in a sealed reactor; such as a bomb, and heated at a temperature of about 130° to 180°C under a pressure of about 15 to 30 atmospheres until the reaction is substantially complete, generally from about 12 to about 20 hours. substantially anhydrous conditions are preferably maintained during this procedure. The product can be separated by conventional procedures such as evaporation or distillation to remove excess medium and low boiling starting materials. It can be purified by conventional procedures, such as liquid-liquid extraction, washing, recrystallization and the like, and can be conveniently converted to the free base, purified in that form, then converted to a pharmaceutically acceptable salt for further purification.

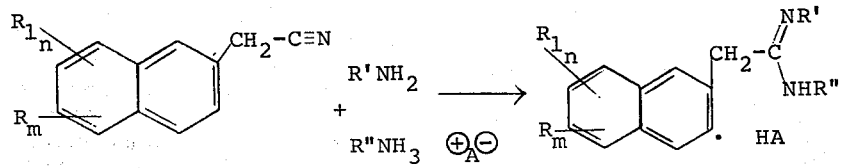

where, $m$, $n$, R, $R_1$, and R' and R'' have the significance set out above and A represents an anion. The structure of the amidine salt portion of the product in the above formulae can also be written as

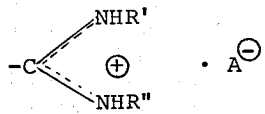

The reaction proceeds when the reactants are contacted and mixed, at a temperature in the range from about 140°C. to about 180°C. and under superatmospheric pressure. In a convenient procedure, the primary ammonium ion is conveniently supplied by using a primary ammonium salt, the anion of which (A in the above formula) is not detrimentally reactive with the other reactants. Suitable anions include inorganic anions, chloride, bromide, iodide, fluoride, sulfate, carbonate and organic anions such as toluenesulfonate, acetate, formate, etc., preferably a pharmaceutically acceptable halide salt such as the chloride or bromide.

The proportions of reactants to be employed can be varied considerably; however, it is critical to employ an excess of the alkylamine. With the alkylammonium ion supplied as the alkylamine salt, at least one molar proportion of the salt for each molar proportion of the nitrile starting material, should be used so as to provide sufficient of the anion to obtain the product as a salt.

The pharmaceutically acceptable salts of the free base substituted amidines can be prepared by dissolving the free base in a minimal amount of alcohol, or ether or chloroform and adding an alcohol solution of an acid such as hydrochloric acid, hydrobromic acid, malic acid, maleic acid, p-toluenesulfonic acid, or succinic acid until precipitation of the corresponding salt is complete. The salt can further be purified by recrystallization or converted to the free base form.

The free base substituted amidine can be prepared by neutralization of the salt in aqueous base. The salt is mixed with a molar equivalent amount of sodium hydroxide in aqueous solution, excess aqueous sodium carbonate or the like, after which the free base can be separated by extraction with an organic solvent. The solvent can be removed by conventional methods such as evaporation or distillation. The product can be purified by conventional procedures such as washing or recrystallization.

DESCRIPTION OF THE PREFERRED EMBODIMENTS

The following examples illustrate the invention but are not to be construed as limiting the same.

EXAMPLE 1

Using glass vessels dried at 125°C. before use,

N-methyl-2-naphthylacetamide (19.9 grams; 0.1 mole) is dispersed in a mixture of 150 milliliters of methylene chloride and triethyloxonium fluoroborate (19 grams; 0.1 mole). The reaction mixture is stirred at room temperature for 24 hours, then cooled in an acetone-Dry Ice bath while monomethylamine (10 grams; 0.33 mole) is added. The mixture is then stirred an additional 18 hours at room temperature. During the foregoing additions and mixing of reactants the mixture is maintained under a dry nitrogen blanket. The reaction mixture is then concentrated under vacuum, suspended in water, made strongly alkaline by addition of cold aqueous 20 percent sodium hydroxide, and extracted with ethyl acetate. The organic phase is separated, washed with water and dried over anhydrous sodium sulfate. Excess dry gaseous hydrogen chloride is introduced into the mixture, and the resulting mixture is filtered. The product is obtained as a solid filter cake, which is crystallized from isopropanol. The 2-(2-naphthalene)-N,N'-dimethylacetamidine hydrochloride product is obtained in a yield of 9 grams; corresponding to a 36.5 percent yield based on the acetamide starting material. The product is found to melt at a temperature of 223.5°–224.5°C. The product is found by elemental analysis to have carbon, hydrogen and nitrogen contents of 67.37, 7.14 and 11.24 percent, respectively, as compared with the theoretical contents of 67.59, 6.89 and 11.26 percent, respectively, calculated for the named structure. It is recrystallized twice more from isopropanol and elemental analyses of C, H, and N are found to be 67.12, 6.97 and 11.16. Infrared and nuclear magnetic resonance analyses also confirm the named structure.

EXAMPLE 2

36 Grams (1.15 mole) of anhydrous methylamine is dissolved in 100 milliliters of anhydrous methanol and 8.35 grams (0.05 mole) of 2-naphthylacetonitrile and 6.75 grams (0.1 mole) of methylamine hydrochloride are added. The resulting mixture is placed in a 300 milliliter bomb and heated for 15 hours at a temperature of 140°C. The pressure in the bomb during this reaction period is 300 pounds per square inch gauge, about 21.4 atmospheres or 16,274 millimeters of mercury. The mixture is allowed to return to room temperature and pressure, then evaporated to dryness under reduced pressure. The residue is taken up in a mixture of 100 milliliters of chloroform and 100 milliliters of cold (0°C.) aqueous 10 percent sodium hydroxide. The organic layer is washed with three 100 milliliter volumes of aqueous sodium chloride, dried over anhydrous sodium sulfate and evaporated to dryness in vacuo. The residue is taken up in a minimal amount of chloroform and an ether solution of hydrogen chloride is added whereupon the product precipitates in the form of the hydrochloride salt. The mixture is filtered to obtain the hydrochloride salt product as a filter cake, and dried in vacuo at room temperature. 8.9 Grams of the N,N'-dimethyl-2-naphthaleneacetamidine hydrochloride product are obtained, a yield of 68 percent calculated on the basis of the nitrile starting material. The product is found to melt at 216.5°–222°C. After recrystallization from water, the product is obtained as plate crystals, which appear to contain water of hydration, melting at 219°–224°C. Recrystallization from isopropanol gives the product as white crystals melting at 223.5°–224.5°C.

In a similar procedure, the following compounds of the invention can be prepared:

N,N'-Diethyl-2-naphthaleneacetamidine hydrochloride, having a molecular weight of 276.80;

N,N'-Diisopropyl-2-naphthaleneacetamidine hydrochloride, having a molecular weight of 304.85;

N,N'-Dimethyl-5-chloro-6-methoxy-2-naphthaleneacetamidine hydrochloride, having a molecular weight of 313.22;

N,N'-Dimethyl-1-bromo-2-naphthaleneacetamidine hydrochloride, having a molecular weight of 327.66;

7,N,N'-Trimethyl-2-naphthaleneacetamidine hydrochloride, having a molecular weight of 262.78; 1,4-N,N'-Tetramethyl-2-naphthaleneacetamidine hydrochloride, having a molecular weight of 276.80;

3,N,N'-Trimethyl-2-naphthaleneacetamidine hydrochloride, having a molecular weight of 262.78;

N,N'-Dimethyl-5,8-dichloro-2-naphthaleneacetamidine hydrochloride, having a molecular weight of 317.64;

N,N'-Dimethyl-6,7-dimethoxy-2-naphthaleneacetamidine hydrochlorde, having a molecular weight of 308.79;

6,N,N'-Trimethyl-2-naphthaleneacetamidine hydrochloride, having a molecular weight of 262.78;

6,N,N'-Triethyl-5-chloro-2-naphthaleneacetamidine hydrochloride, having a molecular weight of 340.31;

N,N'-Di-n-propyl-6-ethoxy-2-naphthaleneacetamidine hydrochloride, having a molecular weight of 348.90;

N-Methyl-N'-ethyl-2-naphthaleneacetamidine hydrochloride, tautomeric with N-ethyl-N'-methyl-2-naphthaleneacetamidine hydrochloride, having a molecular weight of 262.78, is prepared by using equal parts of methylamine and ethylamine; methyl- and ethylamine hydrochloride in the procedure of Example 2. The assymetrically substituted amidines are subject to tautomerism, and the product can be generally regarded as a mixture of the tautomeric forms.

The substituted amidines of the invention have pharmacological activity in alleviating central nervous system depression and in alleviating symptoms of anxiety or nervous agitation. Thus, they can be administered to mammals by conventional routes such as orally or by intraperitoneal, intramuscular or intravenous injection to alleviate central nervous system depression or anxiety symptoms. A particular advantage of the compounds is that they exhibit little or no effect on the cardiovascular system and little or no anticholinergic activity at dosages consistent with good central nervous system activity. The compounds can be formulated with conventional pharmaceutical excipients to facilitate administration. As with most known pharmacologically active compounds, the substituted amidines vary somewhat in activity, and the amount of compound to be employed in a given situation will depend on such factors as the exact compound or pharmaceutically acceptable salt employed, the route of administration, the animal treated, the formulation employed, etc.

In representative operations, the compound N,N'-dimethyl-2-naphthaleneacetamidine hydrochloride is found to protect mice against central nervous system depression and ptosis resulting from intraperitoneal injection of reserpine at a dosage rate of 2.5 milligrams reserpine per kilogram of body weight. The test compound is found to have an intraperitoneal $ED_{50}$ of 12.6 milligrams per kilogram, about one sixth its intraperitoneal acute $LD_{50}$ and about one fortysixth its oral acute $Ld_{50}$. When administered orally, the $ED_{50}$ is found to be 17.1 mg/kg for the same compound in the same test. The compound is also found to potentiate hyperactivity, fighting and death resulting from subcutaneous administration of 20 mg/kg of yohimbine hydrochloride to mice aggregated in small cages. In these operations, the test compound is administered by intraperitoneal injection 30 minutes before the yohimbine challenge, and is found to potentiate lethality with an $ED_{50}$ of 0.8 mg/kg, indicating potent antidepressant action.

In other operations, the same test compound is tested to evaluate its effect on behavior of mice trained to avoid a mild electric shock administered through the cage floor by jumping to an insulated platform. Intraperitoneal administration of 10, 21.5 and 46 mg/kg of the test compound is found to have no significant effect on the learned shock-avoidance behavior. Calmative or anxiolytic activity is evaluated in a similar test in which two mice are combined in a small glass cage and subjected to mild electric shock through the cage floor. In the procedure, untreated mice exhibit aggression and fighting. The test compound N,N'-dimethyl-2-naphthaleneacetamidine hydrochloride is found to inhibit the electroshock-induced aggression with an intraperitoneal $ED_{50}$ of 12.6 mg/kg, when administered 30 minutes before the test.

What is claimed is:

1. A substituted amidine compound selected from the group consisting of compounds corresponding to the formula

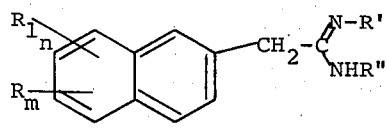

wherein R and $R_1$ independently represent halo, loweralkyl or loweralkoxy, $m$ and $n$ each independently represent one of the integers zero or one; and R' and R'' each independently represent loweralkyl or a salt thereof of a pharmaceutically acceptable acid thereof.

2. A compound of claim 1 wherein R' and R'' represent methyl.

3. A compound of claim 2 wherein R and $R_1$ represents hydrogen.

4. A compound of claim 1 wherein the compound is N,N'-dimethyl-2-naphthaleneacetamidine hydrochloride.

* * * * *